United States Patent
Levin et al.

(10) Patent No.: US 11,841,289 B2
(45) Date of Patent: Dec. 12, 2023

(54) POLARITY RECEIVE MODULE

(71) Applicant: Lifodas, UAB, Vilnius (LT)

(72) Inventors: Piotr Anatolij Levin, Vilnius (LT); Sergej Karpichin, Vilnius (LT)

( * ) Notice: Subject to any disclaimer, the term of this patent is extended or adjusted under 35 U.S.C. 154(b) by 319 days.

(21) Appl. No.: 17/094,883

(22) Filed: Nov. 11, 2020

(65) Prior Publication Data
US 2022/0146373 A1     May 12, 2022

(51) Int. Cl.
*G01M 11/00* (2006.01)
*G02B 6/38* (2006.01)

(52) U.S. Cl.
CPC .... *G01M 11/3154* (2013.01); *G01M 11/3109* (2013.01); *G01M 11/3136* (2013.01); *G02B 6/385* (2013.01); *G02B 6/3885* (2013.01); *G02B 6/3897* (2013.01)

(58) Field of Classification Search
CPC .... G02B 6/385; G02B 6/3885; G02B 6/3897; G01M 11/30; G01M 11/31; G01M 11/3109; G01M 11/3118; G01M 11/3127; G01M 11/3136; G01M 11/3145; G01M 11/3154; G01M 11/3163; G01M 11/3172; G01M 11/3181; G01M 11/319; G01M 11/33; G01M 11/331; G01M 11/332; G01M 11/333; G01M 11/334; G01M 11/335; G01M 11/336; G01M 11/337; G01M 11/338
See application file for complete search history.

(56) References Cited

U.S. PATENT DOCUMENTS

| | | | | |
|---|---|---|---|---|
| 7,808,621 B2 * | 10/2010 | Russell | ............... | H04B 10/071 356/73.1 |
| 7,956,992 B2 * | 6/2011 | Watte | .................. | G01M 11/3154 356/73.1 |
| 8,482,725 B2 * | 7/2013 | Perron | ............... | G01M 11/3118 356/73.1 |
| 8,523,457 B2 * | 9/2013 | Liu | ...................... | G02B 6/3885 385/74 |
| 9,184,833 B2 * | 11/2015 | Kassler | ............. | G01M 11/3154 |
| 10,012,564 B2 * | 7/2018 | Irving | ..................... | G02B 6/385 |
| 10,371,596 B2 * | 8/2019 | L'Heureux | ........ | G01M 11/3136 |
| 10,775,566 B2 * | 9/2020 | Parsons | ................. | G02B 6/4292 |
| 10,862,582 B1 * | 12/2020 | L'Heureux | .......... | H04B 10/035 |
| 10,962,443 B1 * | 3/2021 | Levin | ................... | G01M 11/335 |
| 11,125,963 B2 * | 9/2021 | Herman | ............... | G02B 6/4471 |
| 11,175,458 B2 * | 11/2021 | Ota | ...................... | G02B 6/2773 |
| 11,271,641 B1 * | 3/2022 | Perron | .............. | G01M 11/3136 |
| 11,391,895 B2 * | 7/2022 | Gniadek | .............. | G02B 6/3895 |

(Continued)

FOREIGN PATENT DOCUMENTS

CN    102449522 B  *  9/2015  ........... G02B 6/3885

*Primary Examiner* — Gordon J Stock, Jr.
(74) *Attorney, Agent, or Firm* — Chisholm Persson + Ball PC; Michael J. Persson

(57) ABSTRACT

The present invention is a passive receive module for use with an OTDR for determining polarity of a cable under test. Only one position of the module connector of the receive module includes a filling and all other positions are occupied with a reflective component with a reflective characteristic distinct from that of the filling. Only one position at the OTDR end of the cable will receive a distinct reflection from all of the other positions. Polarity may be determined from these positions.

14 Claims, 3 Drawing Sheets

(56) References Cited

U.S. PATENT DOCUMENTS

2010/0066997 A1* 3/2010 Conner .............. G01M 11/3154
356/73.1
2015/0378113 A1* 12/2015 Good ................... G02B 6/3851
385/71

* cited by examiner

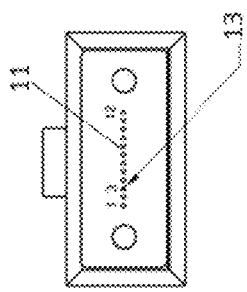
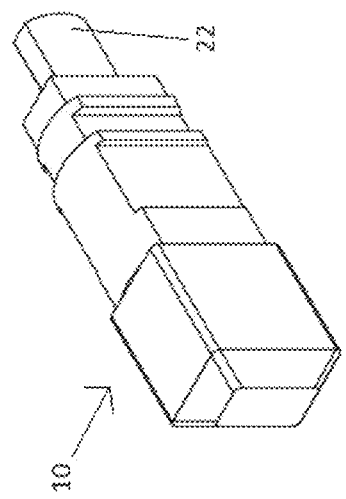

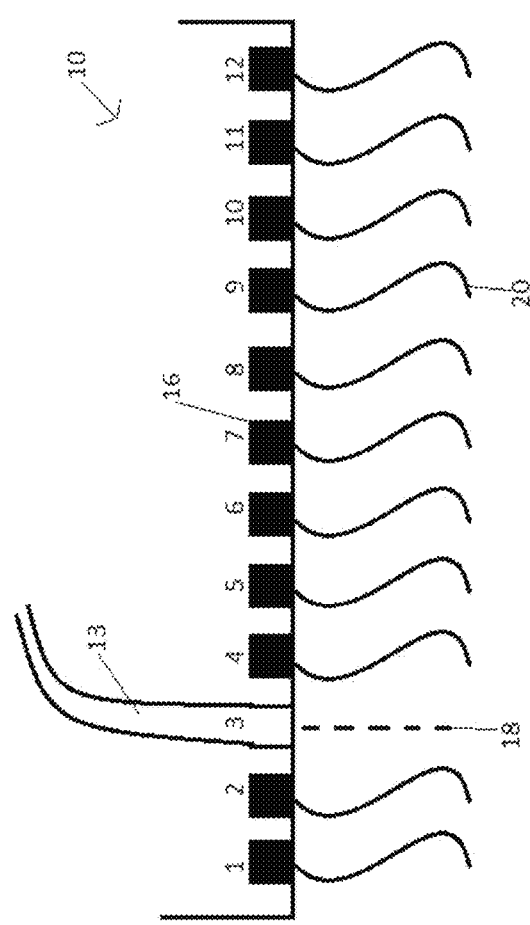
Fig. 3
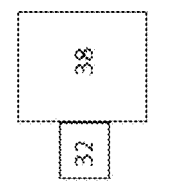
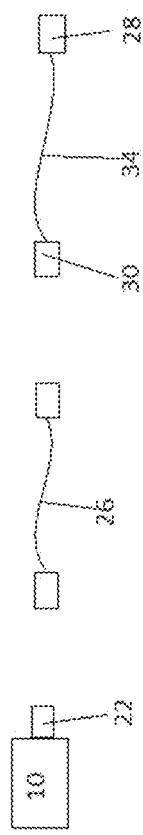
Fig. 4

POLARITY RECEIVE MODULE

FIELD OF THE INVENTION

The present invention relates to fiber optic cable testers, and in particular, to a more efficient polarity tester.

BACKGROUND

Multi-fiber connectors are increasingly ubiquitous in optical fiber dense networks. Basic maintenance of the fiber optic cables within these networks requires knowing the polarity of the multi-fiber connectors.

There are several common configurations of multi-fiber polarity. Type A polarity, illustrated in FIG. 1A, has a first fiber extend between position 1 at the first connector 14 on one end of the multi-fiber cable 34 to position 1 at the second connector 36 on the other end of the multi-fiber cable 34. The second fiber extends between position 2 at the first connector 14 and position 2 at the second connector 36, and so on. Type B polarity, illustrated in FIG. 1B, has a first fiber extend between position 1 at the first connector 14 and position 12 at the second connector 36. The second fiber extends between position 2 and position 11, and so on. Type C polarity, illustrated in FIG. 1C, has a first fiber extend between position 1 at the first connector 14 and position 2 at the second connector 36. The second fiber extends between position 2 at the first connector 14 and position 1 at the second connector 36. The third fiber extends between position 3 at the first connector 14 and position 4 at the second connector 36. The fourth fiber extends between position 4 at the first connector 14 and position 3 at the second connector 36, and so on. It is understood that such polarities may be used with multi-fiber cables 34 of fewer or greater than twelve fibers, with the same general patterns of the fibers extending between the two connectors 14, 36. It is also understood that the fiber polarities may not fall under any of these common configurations, and may be custom or proprietary.

Several products exist to address the requirement to test the multi-fiber connectors for correct polarity. In several of these, individual lasers for each fiber or expensive optical switches couple light into each fiber. Examples of such prior art include the OP280MT Ribbon Visual Fault Locater sold under the trademark OPTOTEST. This product verifies correct polarity of ribbon fiber connectors by illuminating each of the twelve fibers with bright 635 nm red lasers. Another similar such prior art product is the MT Tracer sold under the trademark AFL. This product is a visual fault locator that provides twelve separately controlled visible lasers that can illuminate a selected fiber or automatically sequence through all twelve fibers. Both of these products use a laser for each fiber. Other prior art test products use one laser and an expensive optical switch to direct the one laser light into each of the twelve fibers. Many of these prior art test products also use expensive intelligent receivers with photodiodes and a display to receive and display the results of the test.

U.S. Pat. No. 10,371,596 to L'Heureux discloses a method and system for identifying or verifying the fiber arrangement and/or the cable type of multi-fiber array cables that employs an optical time domain reflectometer (OTDR) acquisition device at the near end of the cable, a loopback device at the far end, and an array of signatures detectable by the OTDR, either at the far or the near end. The loopback device allows performing bidirectional OTDR measurements with a single OTDR acquisition device and the signature array provides fiber arrangement/cable type identification or verification. The inventor's U.S. Pat. No. 10,962,443, which is hereby incorporated by reference, discloses a test device that tests fibers extending between a first connector and a second connector. The test device includes first and second light sources, an optical splitter, and a receiver in communication with the second connector. The first and second light sources emit distinct first and second light patterns. The first light pattern lights a single fiber and the optical splitter splits the second light pattern to light each of the other fibers. The receiver detects the first light pattern being emitted from a single fiber at the second connector, and polarity may be determined therefrom.

In addition, OTDR methods exist for verifying the fiber arrangement/cable type of multi-fiber array cables, but in order to perform bidirectional OTDR analysis with these methods, either two OTDRs should be used, i.e. one at each end of the link under test, or a single OTDR should be moved from one end to the other.

While any of the devices described above may determine polarity, there remains a need for a simpler, less expensive passive polarity tester for multi-fiber connectors.

SUMMARY OF THE INVENTION

The present invention is a receive module and kit including the receive module for testing polarity of a multi-fiber cable.

In its most basic form, the receive module of the present invention includes a module connector that is removably connectable to an N-fiber connector that terminates the multi-fiber cable under test. N is the number of connector fibers in the N-fiber connector. N>1 and is typically a standard multi-fiber number, such as 12, 24, 32, etc. Like typical connectors to an N-fiber connector, the module connector includes N openings that align with the N connector fibers of the N-fiber connector. Unlike typical connectors, those N openings correspond to only X fillings within the receive module, where 1≤X<N. Importantly, at least one of the N openings of the receive module has no associated filling.

The filling is preferably polished metal or a receive fiber, either of which will produce a strong reflection. The filling may also be another optical component with a strong reflection. When the filling is receive fibers, they are disposed in relation to X of the N openings as would be seen in a typical connector, such that light transmitted through the N connector fibers continues through those X receive fibers only.

It is preferred that X=1. In other words, it is preferred that the receive module include only one filling at a known position corresponding to a connector fiber. Regardless of the value of X, it is preferred that the X fillings have a first reflective characteristic. Each opening that does not include a filling includes a reflective component that has a second reflective characteristic distinct from the first. The reflective component placed in the otherwise empty openings may be nothing. As used herein, when the reflective component is nothing, the reflective component is "emptiness." In other words, the absence of any component in an opening may be a "reflective component," as the term is used herein. An empty opening would likely reflect very little or nothing and this non-reflection would be its second reflective characteristic, which would be distinct from the first reflective characteristic of the polished metal or receive fiber. Emptiness would also describe the situation where the opening is filled with a fiber that is terminated short so that the opening is still essentially an empty well. The reflective component may be any other component that may fill the openings that has a different reflective characteristic from the filling, however. In embodiments where the reflective component is not emptiness and has a second reflective characteristic other than non-reflection, having the distinct but present first and second reflective characteristics may provide information even if the fiber under test corresponding to the filling of the receive module lacks continuity, as discussed below with regards to practical examples of the use of the receive module.

More than one opening of the receive module may include a filling but the information provided by the additional fiber corresponding to the additional filling will likely be redundant, as illustrated below. One filling is preferred for simplicity and material efficiency.

When the filling is a receive fiber, the receive fiber may be of any length. The length may be very minimal, approaching 0 m, but just present enough so that a reflection will occur. Longer lengths may support doing a loss measurement by acting as a far end launch cable or receive cable.

The module connector is preferably a flat connector. A flat connector may be used for connection with either a single mode N-fiber angled connector or a multi-mode N-fiber connector. With the angled connector, there will be a gap between the connector fiber and the receive fiber, but the reflection of the receive fiber would still be detectable, such as by an OTDR. The lack of contact ensures no contamination of the cable under test. Non-flat connectors may be used, but are not preferred because the connector fiber and receive fiber will actually touch, which may be a contamination source of the cable under test.

It is illustrative to provide some practical examples of the use of the receive module of the present invention. Assume that a 12 fiber cable terminating in an MPO connector is being tested. Assume also that the receive module of the present invention has a single filling (receive fiber or polished metal) at position 3 of the module connector. Positions 1, 2, and 4-12 of the module connector are occupied by a reflective component that has second reflective characteristic (i.e. the reflective component is not emptiness and the second reflective characteristic is not non-reflection). The near side of the cable under test is connected to an OTDR. The far side is connected to module connector of the receive module of the present invention. Light from the OTDR is transmitted through each of the 12 fibers of the cable in turn. Example results and conclusions that may be drawn therefrom include:

A first reflective characteristic is detected at position 3 of the connector at the OTDR end; a second reflective characteristic, distinct from the first, is detected at positions 1, 2, and 4-12. Conclusion: The cable has Type A polarity; all fibers are continuous.

A first reflective characteristic is detected at position 10 of the connector at the OTDR end; a second reflective characteristic, distinct from the first, is detected at positions 1-4, 6-9, 11, and 12; no reflection or very little reflection is detected at position 5. Conclusion: The cable has Type B polarity; fibers 1-7 and 9-12 are continuous; fiber 8 has a break.

Little or no reflection is detected at position 4 of the connector at the OTDR end; a reflective characteristic is detected at positions 1-3 and 5-12. Conclusion: The cable has Type C polarity; fibers 1, 2, and 4-12 are continuous; fiber 3 has a break.

A first reflective characteristic is detected at position 3 of the connector at the OTDR end; a second reflective characteristic, distinct from the first, is detected at positions 1-5 and 7-12. Conclusion: The cable has a non-standard polarity; all fibers are continuous.

Note that such a passive receive module that includes a reflective component in the openings that are not filled with a receive fiber or other filling will determine continuity as well as polarity.

Let us now consider the situation as described above, but this time, positions 1, 2, and 4-12 of the receive module are empty, i.e. the reflective component is emptiness. This emptiness will have a distinct reflective characteristic from the receive fiber at position 3. It will reflect little if anything and this absence of a more affirmative reflection or non-reflection would be its reflective characteristic that is distinct from the reflective characteristic of fiber, such as the receive fiber at position 3. This lack of reflection is similar to the lack of reflection that a non-continuous fiber would provide, so less information, and sometimes no information (as illustrated below), will be garnered from the test, especially regarding continuity. Again, light from the OTDR is transmitted through each of the 12 fibers of the cable in turn. Example results and conclusions that may be drawn therefrom include:

A reflective characteristic is detected at position 3 of the connector at the OTDR end; no reflection or very little reflection is detected at positions 1, 2, and 4-12. Conclusion: The cable has Type A polarity; at least fiber 3 is continuous.

A reflective characteristic is detected at position 10 of the connector at the OTDR end; no reflection or very little reflection is detected at positions 1-9, 11, and 12. Conclusion: The cable has Type B polarity; at least fiber 3 is continuous.

Little or no reflection is detected at any position of the connector at the OTDR end. Conclusion: Polarity is not determined; assuming the cable has a standard polarity, at least fiber 3, 4, or 10 has a break.

As illustrated, when the non-filler openings are empty and not filled with a reflective component, their reflective characteristics are not distinguishable from those indicating a lack of continuity on a fiber. Unless a break happens to be on the fiber corresponding to the filling, polarity (at least a standard polarity, such as Type A, B, or C) will still be determinable. Continuity of the remaining fibers is ambiguous though.

In its most basic form, the kit of the present invention includes the receive module of the present invention in any of the embodiments described above, an optical device, and an optical switch. The kit may be used to determine the polarity of a multi-fiber cable terminating at one end in a first connector and at the other in a second connector. The receive module is configured to removably connect to the second connector. The optical device is configured to removably connect to the first connector; transmit light along fibers of the cable; and detect light reflections transmitted along the fibers. The optical device is preferably an OTDR. In some embodiments, the optical switch is integrated into the optical device/OTDR. The optical switch switches between fibers within the cable under test. The optical device/OTDR transmits light along each of the fibers in turn as the switch switches between them and receives reflections back from the receive module. It will be known through which fiber the optical device/OTDR transmits light and the optical device/OTDR will detect the positions and reflective characteristics at each position of the reflections, thus making it possible to determine polarity, as discussed above.

In some embodiments, the kit also includes a patch cord with a flat connector on one end and an angled connector on the other. The patch cord acts as an adaptor in case the second connector is not adapted for connection to the module connector.

These aspects of the present invention are not meant to be exclusive and other features, aspects, and advantages of the present invention will be readily apparent to those of ordinary skill in the art when read in conjunction with the following description and accompanying drawings.

BRIEF DESCRIPTION OF THE DRAWINGS

FIG. 2A is a perspective view of the receive module of the present invention.

FIG. 2B is a front view of the receive module of the present invention.

FIG. 3 is a cutaway diagram of the receive module of the present invention.

FIG. 4 is a block diagram indicating the components of the kit of the present invention.

DETAILED DESCRIPTION

Figure 1A:
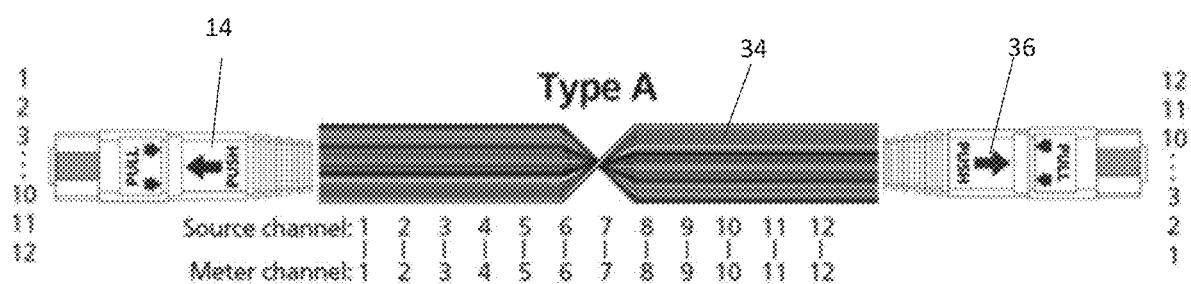
FIGS. 1A-1C are prior art diagrams of Types A, B, and C polarities, respectively.
Figure 1B:
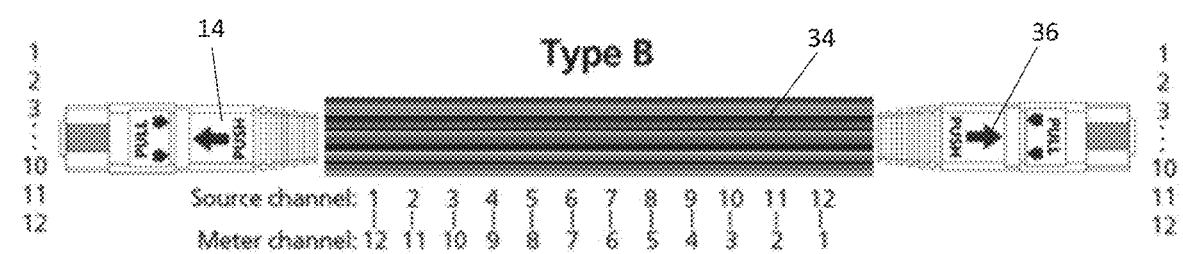
Figure 1C:
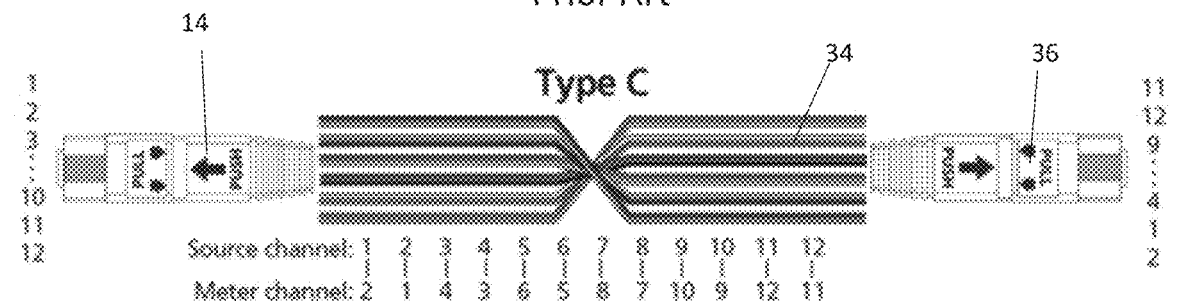

Referring first to FIG. 2A, a perspective view of passive receive module 10 of the present invention is provided. Receive module 10 is a simple device. It does not require a power source. It is truly a passive device that merely reflects light provided from another source back at that source. Receive module 10 will connect to a multi-fiber cable under test 34 (shown in FIG. 4) at module connector 22. Although not shown, it is understood that module connector 22 is preferably a flat connector.

Now referring to FIG. 2B, a front view of a face of module connector 22 is provided. Receive module 10 includes N openings 11, corresponding to the N fibers in cable 32. As shown N=12. Positions 1, 3, and 12 at these openings 11 are labeled. Position 3 includes filler 13, which is preferably a receive fiber or a piece of polished metal. This is the only opening 11 that includes a filler 13. As shown in FIG. 3, all other openings 11 are filled with reflective components 16.

Now referring to FIG. 3, a cutaway diagram of receive module 10 is provided. Positions 1-12, corresponding to the positions of the fibers within cable 32 are labeled and there is an opening 11 at each. Openings 11 at positions 1, 2, and 4-12 are filled with reflective component 16. Reflective component 16 is preferably emptiness, which will have a second reflective characteristic 20 of non-reflection. Opening 11 at position 3 is filled with filling 13, which is a receive fiber in this case. Filling 13 and reflective components 16 have distinct first and second reflective characteristics 18, 20, respectively. First reflective characteristic 18 is represented by a dashed line and second reflective characteristic 20 is represented by wavy lines. These representations merely indicate the distinction between first and second reflective characteristics 18, 20 and that substantially the same reflective characteristic 20 will be produced (or not produced if the second reflective characteristic 20 is non-reflection) by all of the reflective components 16.

Now referring to FIG. 4, a block diagram indicating the components of kit 24 of the present invention is provided. Kit 24 includes receive module 10 with module connector 22, optical switch 32, and optical device 38. Optical device 38 is configured to removably connect to the first connector 28 of cable 34; transmit light along the fibers of cable 34; and detect light reflections transmitted along the fibers of cable 34. Optical device 38 is preferably an OTDR. Optical switch 32 directs the light transmitted by optical device 38 through individual and specific fibers of cable 34. Optical switch 32 is capable of switching the direction of light onto the several fibers. Optical switch 32 may or may not be integrated directly into optical device 38. Patch cord 26 may be included to act as an adaptor in case the second connector 30 of cable 34 is not configured for connection to module connector 22.

Although the present invention has been described in considerable detail with reference to certain preferred versions thereof, other versions would be readily apparent to those of ordinary skill in the art. Therefore, the spirit and scope of the description should not be limited to the description of the preferred versions contained herein.

We claim:

1. A receive module configured to removably connect with an N-fiber connector at which N connector fibers are terminated and N>1, said receive module comprising:
 a module connector that connects with the N-fiber connector, said module connector comprising:
  N openings that align with the N connector fibers of the N-fiber connector;
  X fillings disposed within X of said N openings, wherein: $1 \leq X < N$; and
  said at least one filling comprises a first reflective characteristic; and
 at least one reflective component disposed within said N openings in which said at least one filling is not disposed, wherein:
  said at least one reflective component comprises a second reflective characteristic;
  said first and second reflective characteristics are distinct; and
  wherein said at least one reflective component is emptiness and said second reflective characteristic of said at least one reflective component is non-reflection.

2. The receive module as claimed in claim 1, wherein said at least one filling is a receive fiber disposed in relation to X of said N openings such that light transmitted through the connector fibers that align with said N openings continues to travel through said X receive fibers.

3. The receive module as claimed in claim 1, wherein said at least one filling is polished metal.

4. The receive module as claimed in claim 1, wherein X=1.

5. The receive module as claimed in claim 1, wherein said module connector is a flat connector.

6. A kit for determining a polarity of an N-fiber cable with N test fibers, where N>1 and the N test fibers are terminated at one end of the N-fiber cable in a first connector and at an other end in a second connector, said kit comprising:
 an optical device configured to:
  removably connect to the first connector of the N-fiber cable;
  transmit light along at least one of the N test fibers; and
  detect light reflections transmitted along at least one of the N test fibers;
 an optical switch configured to change the direction of the light transmitted by said optical device onto individual and specific N test fibers; and
 a receive module configured to removably connect to the second connector of the N-fiber cable, said receive module comprising:
  a module connector that connects with the second connector of the N-fiber connector, said module connector comprising:

N openings that align with the N connector fibers of the N-fiber connector;

X fillings disposed within X of said N openings, wherein:

1≤X<N; and said at least one filling comprises a first reflective characteristic; and at least one reflective component disposed within said N openings in which said at least one filling is not disposed, wherein:

said at least one reflective component comprises a second reflective characteristic;

said first and second reflective characteristics are distinct; and wherein said at least one reflective component is emptiness and said second reflective characteristic of said at least one reflective component is non-reflection.

7. The kit as claimed in claim 6, wherein said optical device is an optical time domain reflectometer (OTDR).

8. The kit as claimed in claim 6, wherein said at least one filling of said receive module is a receive fiber disposed in relation to X of said N openings such that light transmitted through the connector fibers that align with said N openings continues to travel through said X receive fibers.

9. The kit as claimed in claim 6, wherein said at least one filling of said receive module is polished metal.

10. The kit as claimed in claim 6, wherein X=1.

11. The kit as claimed in claim 6, wherein said module connector of said receive module is a flat connector.

12. The kit as claimed in claim 6, further comprising a patch cord.

13. The kit as claimed in claim 6, wherein said optical switch is integrated into said optical device.

14. The kit as claimed in claim 7, wherein said optical switch is integrated into said OTDR.

* * * * *